(12) United States Patent  (10) Patent No.: US 6,731,854 B2
Haruki et al.  (45) Date of Patent: May 4, 2004

(54) OPTICAL FIBER LOCKING DEVICE FOR FUSION SPLICING

(75) Inventors: Kenichiro Haruki, Chiba (JP); Kenji Takahashi, Chiba (JP); Noriyuki Kawanishi, Chiba (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 10/247,486

(22) Filed: Sep. 20, 2002

(65) Prior Publication Data

US 2003/0059193 A1 Mar. 27, 2003

(30) Foreign Application Priority Data

Sep. 21, 2001 (JP) ......................................... 2001-289865

(51) Int. Cl.[7] ................................................. G02B 6/00
(52) U.S. Cl. ........................... 385/137; 385/96; 385/97; 385/136
(58) Field of Search ............................ 385/96, 97, 136, 385/137

(56) References Cited

U.S. PATENT DOCUMENTS 5,524,167 A * 6/1996 Ewert et al. ................. 385/137
2002/0031323 A1 * 3/2002 Hattori et al. ............... 385/137

* cited by examiner

*Primary Examiner*—John D. Lee
*Assistant Examiner*—Eric Wong
(74) *Attorney, Agent, or Firm*—Oblon, Spivak, McClelland Maier & Neustadt, P.C.

(57) ABSTRACT

An optical fiber locking device is provided with a holder base, a table for support of an optical fiber, the table being fitted to the holder base and provided with a magnet and a slit, an openable and closable cover, being connected to the table by a hinge and detachably attached by the magnet and a sliding arm including a finger protruding out from the slit so as to operate the cover and a grip, and movably fitted to the holder base. When the grip is driven to a direction of the cover so as to drive the finger, the finger pushes the magnetically attached cover up so as to be opened.

6 Claims, 13 Drawing Sheets

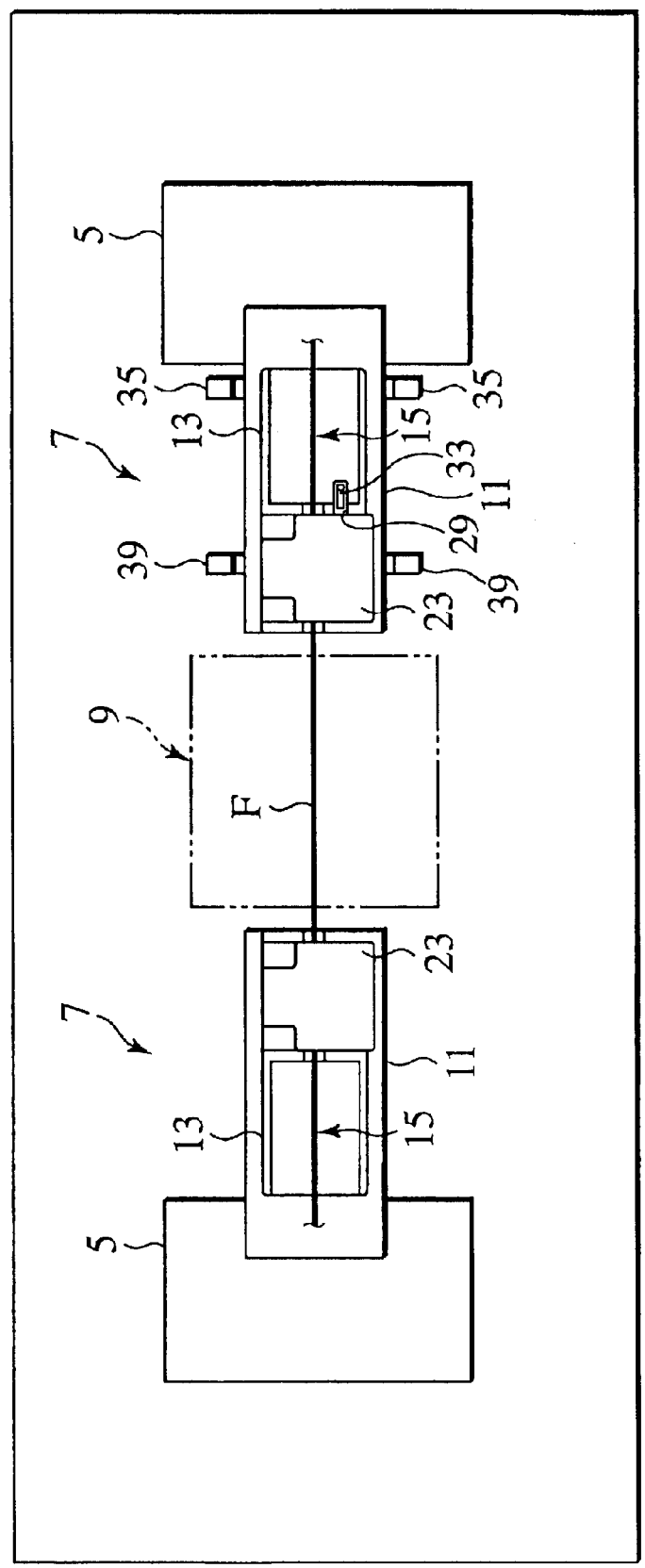

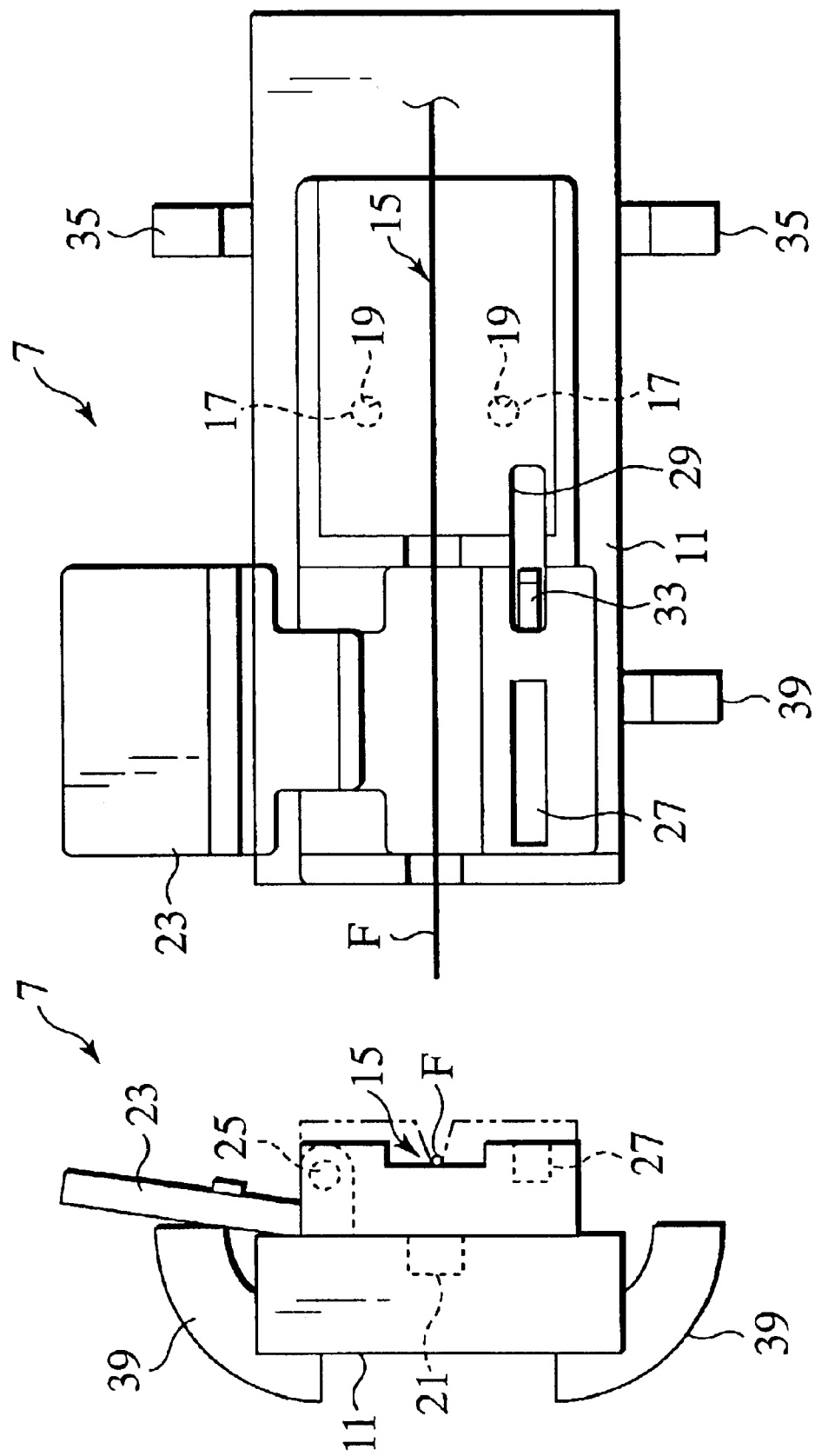

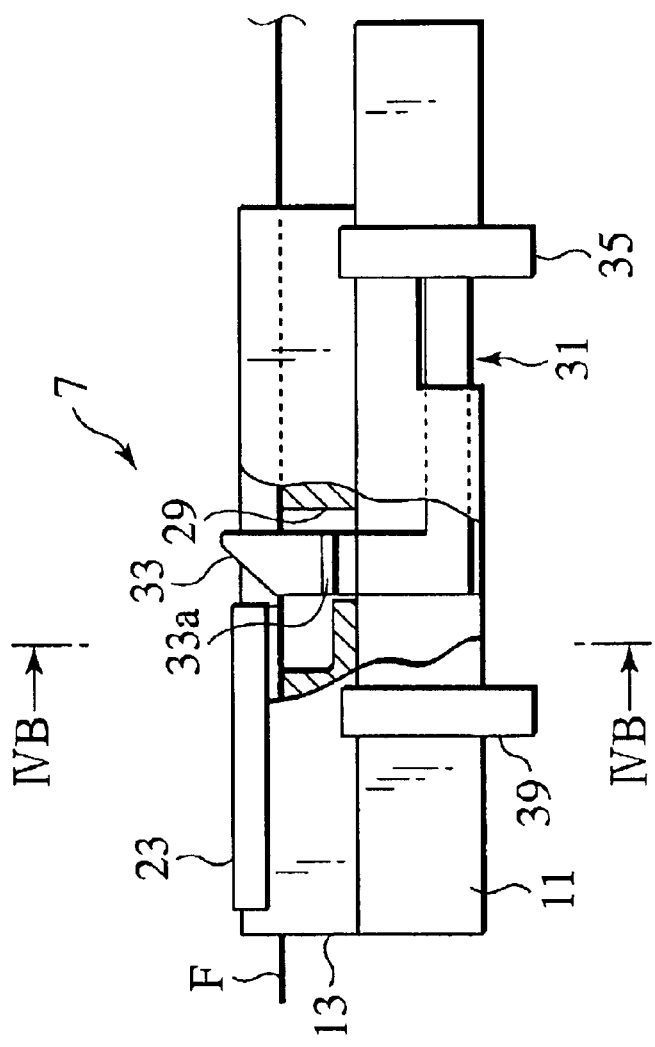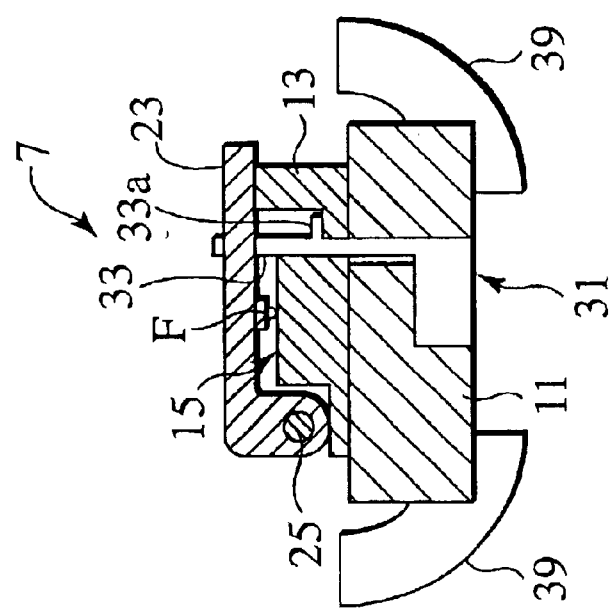

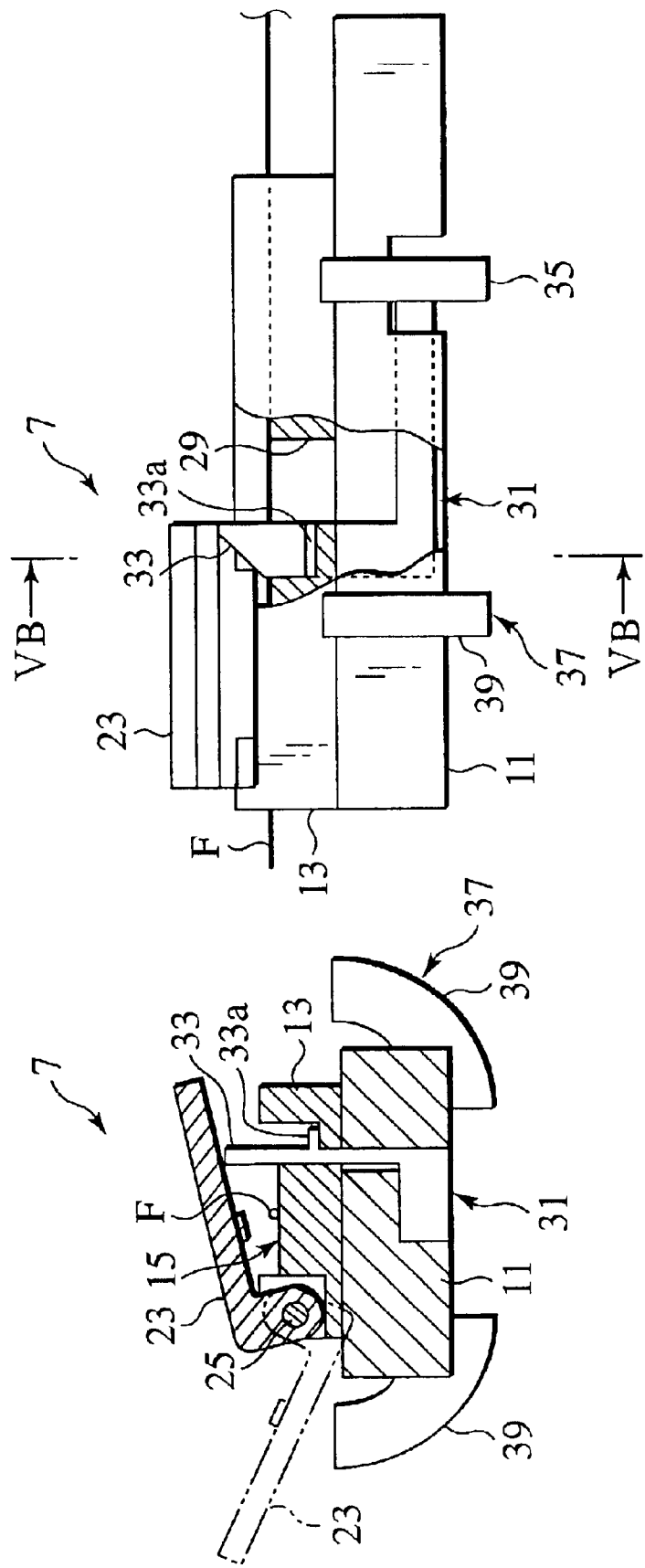

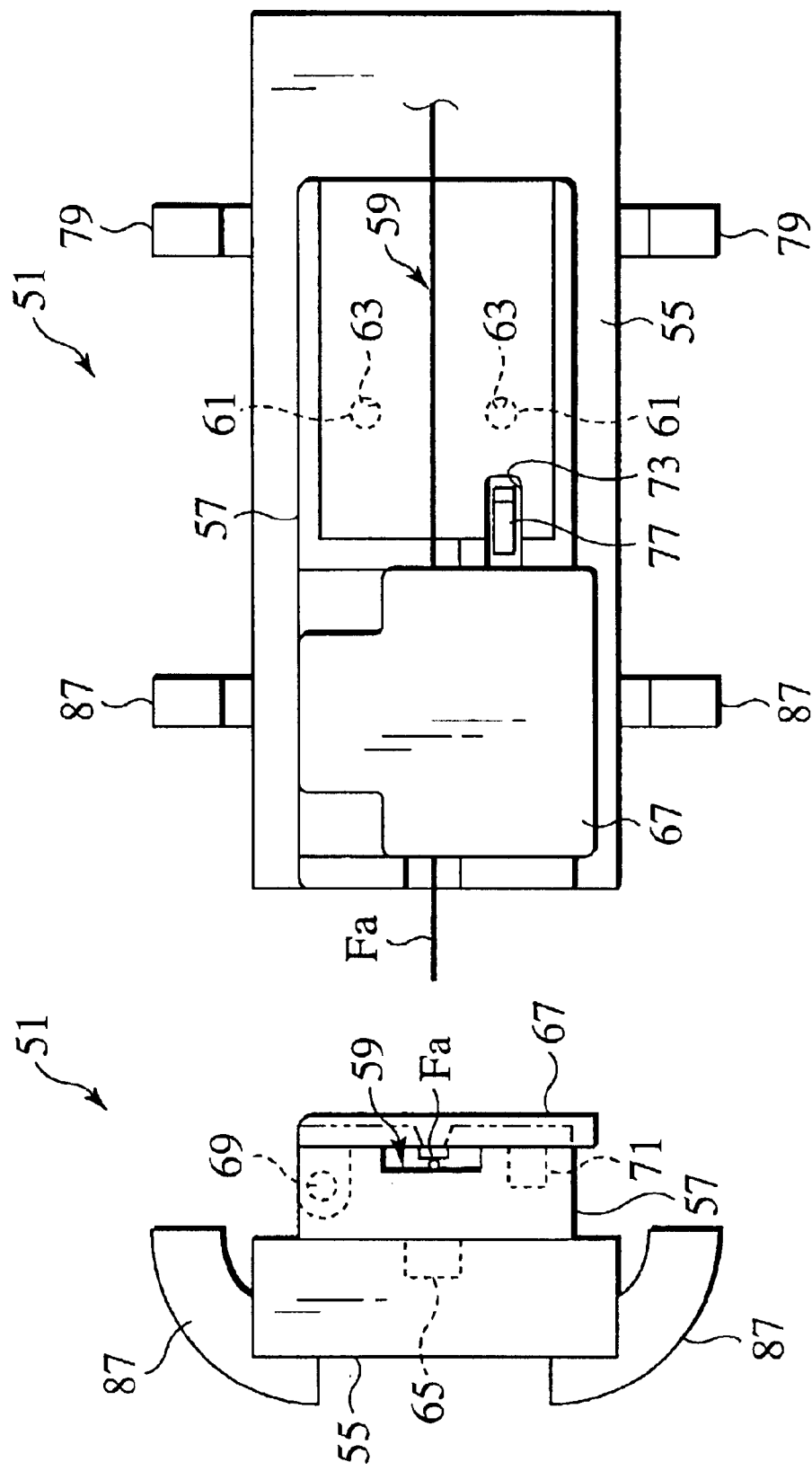

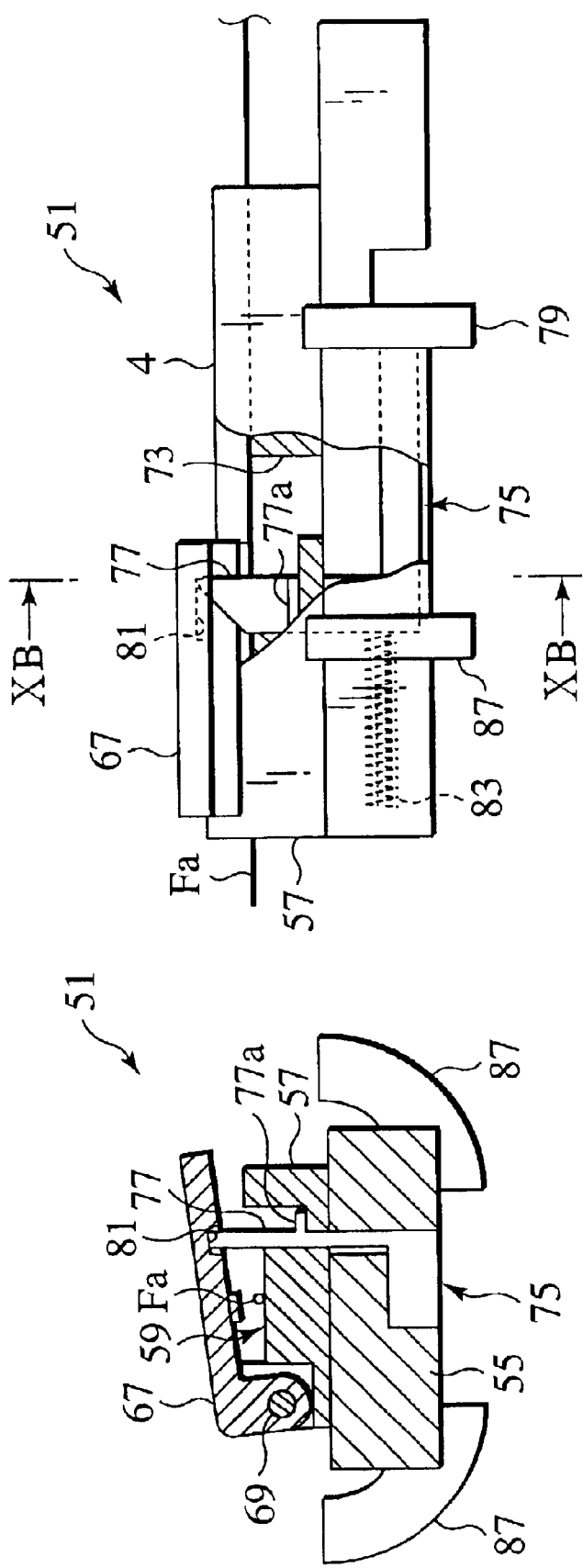

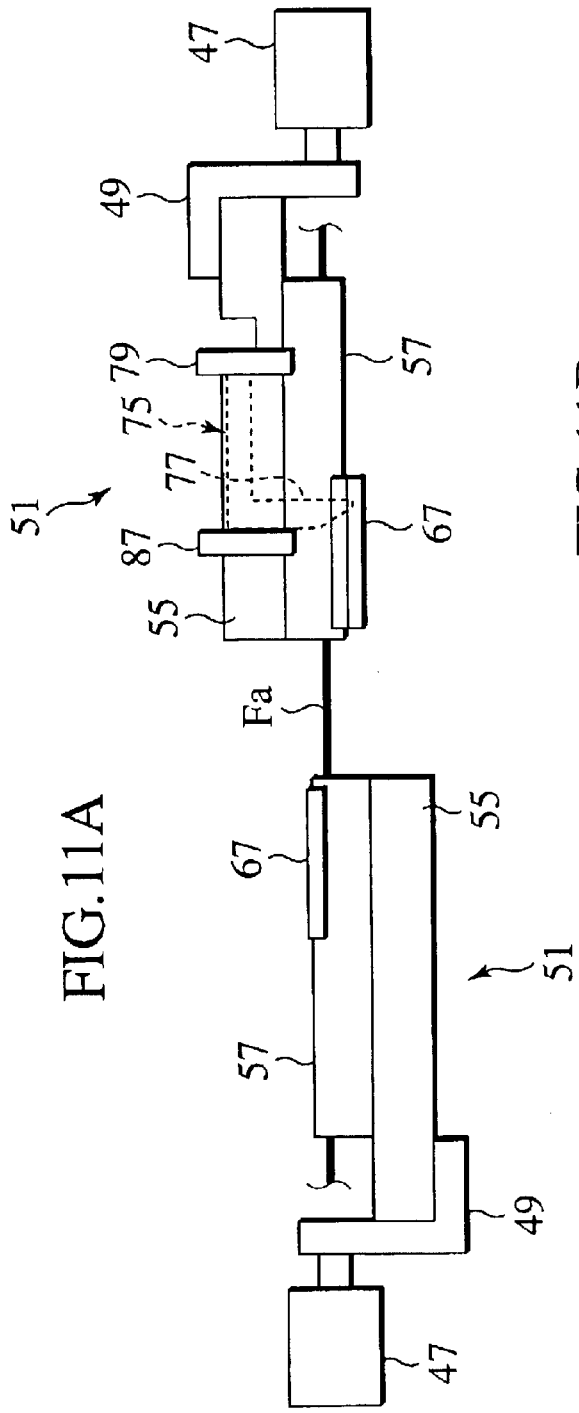
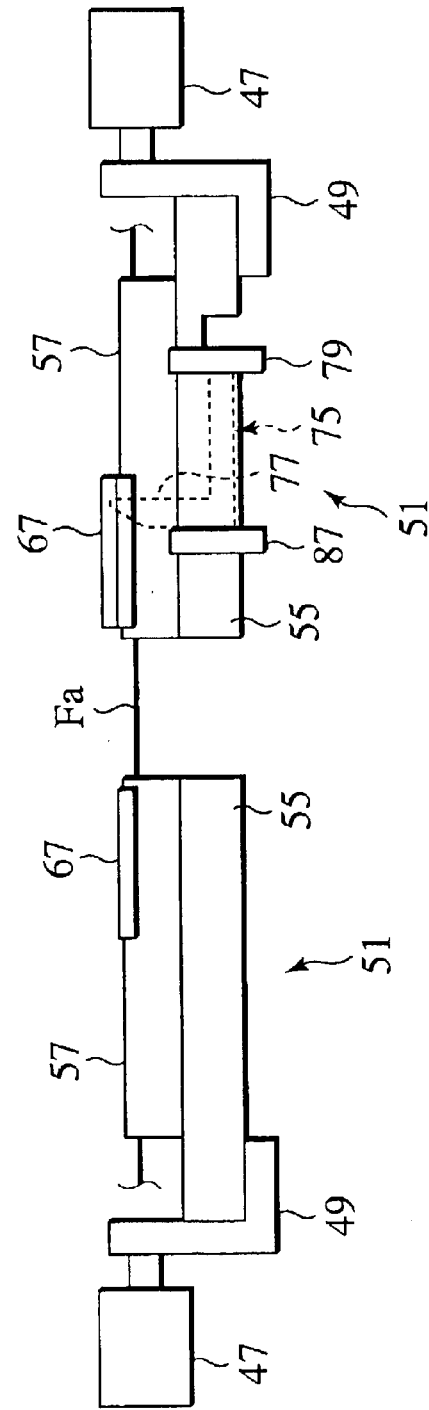

OPTICAL FIBER LOCKING DEVICE FOR FUSION SPLICING

BACKGROUND OF THE INVENTION

1. Field of the Invention

The present invention relates to a locking device used in an apparatus for fusion splicing optical fibers, and more particularly to a locking device which can easily release the optical fibers without breaking after an operation of splicing the optical fibers.

2. Description of the Related Art

A device for fusion splicing two optical fibers is provided with a pair of optical fiber locking devices, and each of the locking devices is fixed to the apparatus so as to freely move in a mutual direction. Each of the locking devices is provided with a cover which can be opened and closed, and is further provided with a fixing means such as a magnet, a clamp or the like for fixing at the closed position. Each of the respective locking devices receives the optical fiber at an open position thereof, and the optical fibers are fixed at the closed position.

Two optical fibers are fixed to the respective locking devices so that axes thereof coincide with each other, and thereafter front ends of the optical fibers are in contact with each other by moving the respective locking devices. The optical fibers are fused by press-contacting a heating means such as a pair of arc electrodes or the like to the contact front ends so as to heat. The structure is made such that the spliced optical fiber can be taken out by canceling the fixing means mentioned above so as to set the cover at the open position.

In the case of axially symmetric optical fibers, the apparatus and method having the structure mentioned above may be employed, however, in the case of non-axially symmetric optical fibers, for example, polarization maintaining optical fibers or the like, a structure of further adjusting an orientation of a rotational direction is required.

A fusion splicing device for the polarization maintaining optical fibers is provided with a mechanism of rotating the locking device in addition to the structure mentioned above. After rotating the locking devices so that the orientations in the rotational direction coincide with each other after fixing the polarization maintaining optical fiber, the fibers are fused to each other.

SUMMARY OF THE INVENTION

In the proposed fusion splicing device mentioned above, an attention is required for an operation of taking out the optical fibers. For example, in the case that a magnet is applied to the fixing means for the cover, since it is necessary to open the cover against a magnetic force of the magnet, a force is applied to the optical fiber in a shearing direction, and this may cause its breaking at worst. Accordingly, it is necessary to hold the locking device by one hand and carefully open the cover by another hand. The operation is laborious for an operator and operability is deteriorated.

Further, in the fusion splicing device for the polarization maintaining optical fiber, since the locking device is rotated for the purpose of coinciding the orientations of the optical fibers as mentioned above, the cover is not necessarily directed to an upper side. In some orientations at a time of firstly fixing the optical fibers, there may be a case where one of them is rotated to be upset. In the case mentioned above, it is necessary for the operator to insert the hand to a back side of the upset locking device so as to perform the operation, and operability becomes significantly deteriorated. It can be considered that the cover is opened after rotating the locking device upward, however, since a force in a twisting direction is applied to the optical fiber in that case, there is a risk of breaking.

The present invention is carried out in light of the problems mentioned above, and an object of the present invention is to provide a locking device for optical fibers which can easily cancel a fixation without damaging the optical fibers.

According to a first aspect of the present invention, an optical fiber locking device is provided with a holder base, a table for support of an optical fiber, the table being fitted to the holder base and provided with a magnet and a slit, an openable and closable cover, being connected to the table by a hinge and magnetically attached by the magnet and a sliding arm including a finger protruding out from the slit so as to operate the cover and a grip, and movably fitted to the holder base. When the grip is driven to a direction of the cover so as to drive the finger, the finger pushes the magnetically attached cover up so as to be opened.

Since the optical fiber is gripped by the table and the cover which are magnetically attached to each other so as to be fixed, it is possible to securely execute a fusion splicing between a pair of optical fibers. After the splicing is finished, it is easy to take out the optical fibers only by moving the grip so as to open the cover.

The optical fiber locking device is more preferably structured such that the sliding arm is provided with a restriction projection which is slidably engaged with the table.

Since the restriction projection is slidably engaged with the table, the cover is not pushed up to the upper side accompanying with a motion that the cover is opened. Accordingly, no force in a shearing direction is applied to the optical fiber, and it is possible to prevent the optical fiber from being damaged.

According to a second aspect of the present invention, the holder base is further provided with a spring which applies a force to the sliding arm in a direction of moving apart from the cover, and the cover is further provided with a recess for being engaged with the finger in addition to the optical fiber locking device having the same structure mentioned above. The finger is engaged with the recess so as to keep a state in which the cover is slightly open.

The cover can be kept in the state of being slightly open only by operating the grip, therefore it is possible to rotate the optical fiber locking device without rotating the optical fiber. Accordingly, even by rotating the optical fiber locking device so as to execute the fusion splicing operation, it is possible to easily open the cover, and a force in a twisting direction is not applied to the optical fiber.

According to a third aspect of the present invention, the optical fiber locking device is provided with a table for supporting an optical fiber, the table provided with a magnet and a slit, an openable and closable cover connected to the table by a hinge and detachably attached by the magnet, and a sliding arm provided with a finger protruding out from the slit so as to operate the cover and a grip, and the sliding arm slidably fixed to the table. When the grip is driven to a direction of the cover so as to drive the finger, the finger pushes the magnetically attached cover up so as to be opened.

According to the third aspect of the present invention, in addition to the same effects as those of the optical fiber locking device according to the first aspect, it is possible to structure the optical fiber locking device in compact since the holder base is not required.

BRIEF DESCRIPTION OF THE DRAWINGS

FIG. 1 is a plan view of an optical fiber fusion splicing device provided with an optical fiber locking device according to a first embodiment of the present invention;

FIG. 3A is a plan view of the optical fiber locking device according to the first embodiment of the present invention, and shows a state in which the cover is open;

FIG. 3B is a side elevational view of the optical fiber locking device according to the first embodiment of the present invention, and shows a state in which the cover is open;

FIG. 4A is a front elevational view of the optical fiber locking device according to the first embodiment of the present invention, and shows a part of a state in which the cover is closed on the basis of a cross section;

FIG. 4B is a view showing a cross section along a line IVB—IVB in FIG. 4A;

FIG. 5A is a front elevational view of the optical fiber locking device according to the first embodiment of the present invention, and shows a part of a state in which the cover is open on the basis of a cross section;

FIG. 5B is a view showing a cross section along a line VB—VB in FIG. 5A;

FIG. 7A is a plan view of the optical fiber locking device according to the second embodiment of the present invention, and shows a state in which a cover is closed;

FIG. 7B is a side elevational view of the optical fiber locking device according to the second embodiment of the present invention, and shows a state in which the cover is closed;

FIG. 10A is a front elevational view of the optical fiber locking device according to the second embodiment of the present invention, and shows a part of a state in which the cover is half open on the basis of a cross section;

FIG. 10B is a view showing a cross section along a line XB—XB in FIG. 10A;

FIG. 11A is a front elevational view of the optical fiber locking device according to the second embodiment of the present invention, and shows a state of rotating one of the optical locking devices;

FIG. 11B is a front elevational view of the optical fiber locking device according to the second embodiment of the present invention, and shows a state of canceling a fixation of the optical fiber so as to return the optical locking device;

DETAILED DESCRIPTION OF THE PREFERRED EMBODIMENT

Figure 2A:
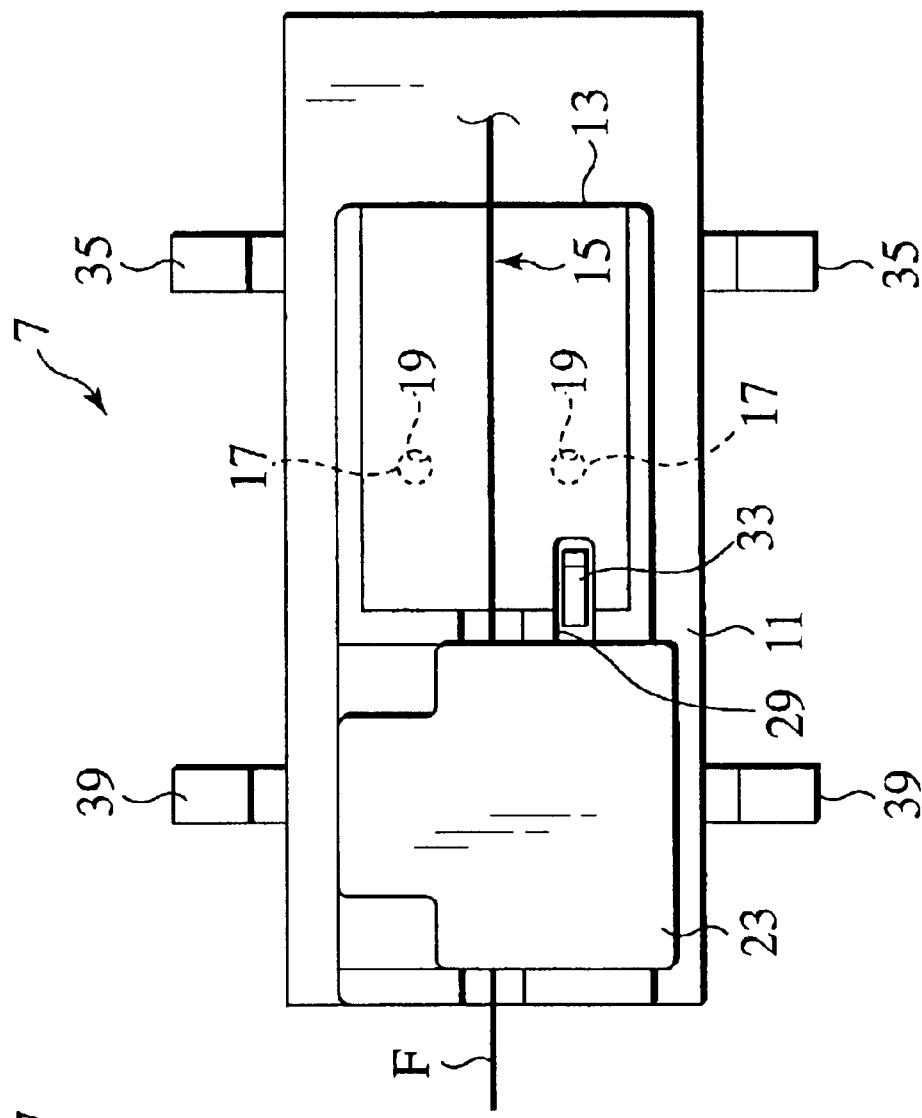
FIG. 2A is a plan view of the optical fiber locking device according to the first embodiment of the present invention, and shows a state in which a cover is closed.
Figure 2B:
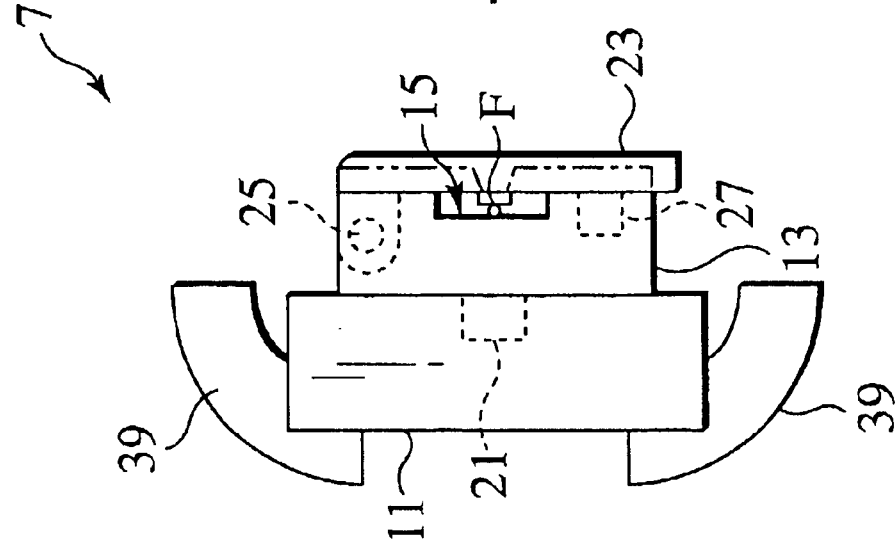
FIG. 2B is a side elevational view of the optical fiber locking device according to the first embodiment of the present invention, and shows a state in which the cover is closed.
Figure 6:
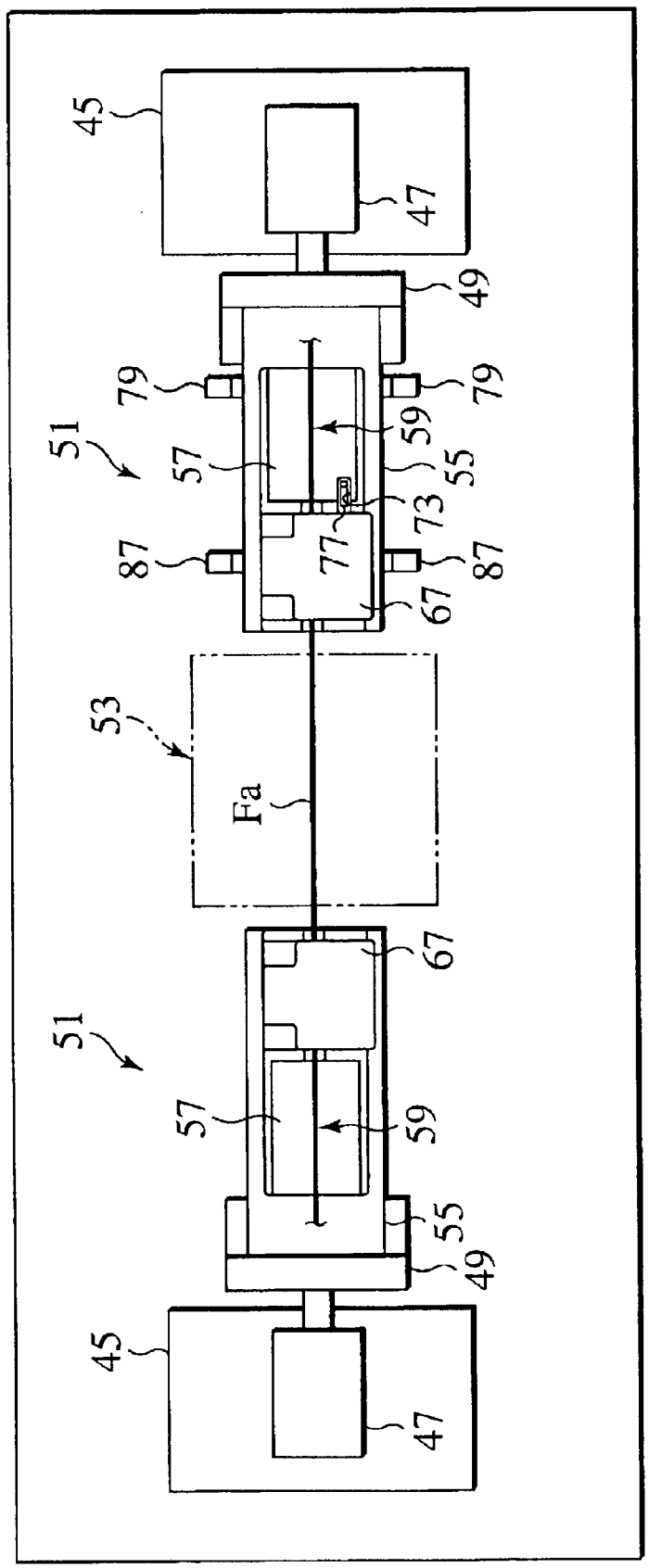
FIG. 6 is a plan view of an optical fiber fusion splicing device provided with an optical fiber locking device according to a second embodiment of the present invention.
Figure 8A:
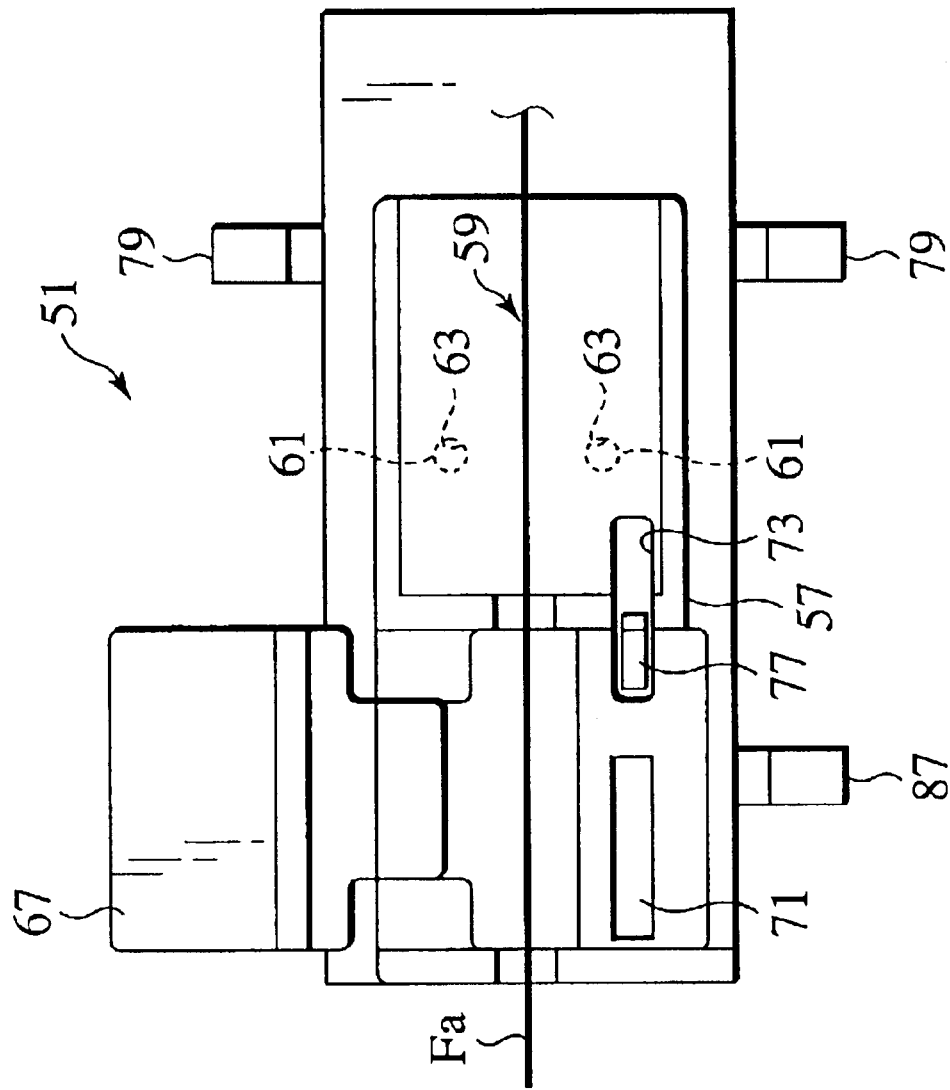
FIG. 8A is a plan view of the optical fiber locking device according to the second embodiment of the present invention, and shows a state in which the cover is open.
Figure 8B:
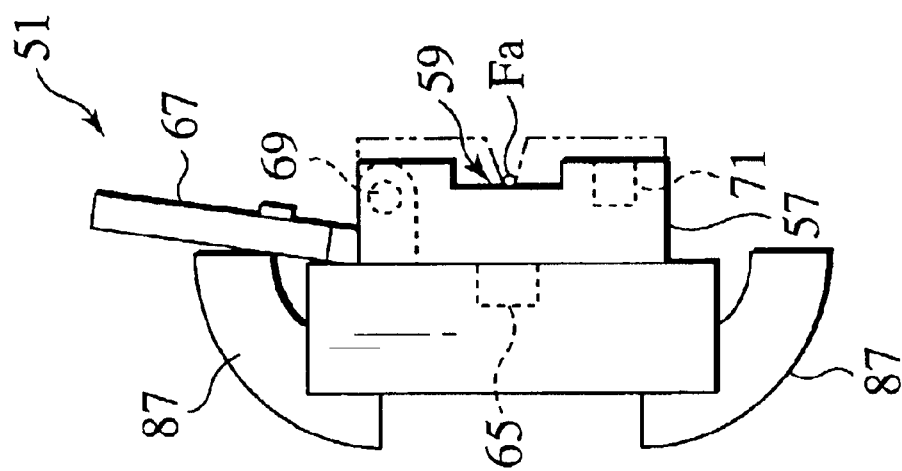
FIG. 8B is a side elevational view of the optical fiber locking device according to the second embodiment of the present invention, and shows a state in which the cover is open.

A description will be given of a first embodiment according to the present invention with reference to FIGS. 1 to 5B.

An optical fiber fusion splicing device 1 is provided with a pair of sliders 5, each of which is driven by a motor (not shown) so as to move in a direction of moving close to each other and an opposite direction thereto. Each of the sliders 5 is provided with an optical fiber locking device 7 for fixing an optical fiber F, which can be moved together with the slider. A fusion means 9 for fusion splicing the optical fiber F is provided between a pair of optical fiber locking devices 7.

The optical fiber locking device 7 is constituted by a holder base 11 and a holder 13 detachably fixed to an upper surface of the holder base 11. The holder base 11 is provided with a plurality of guide pins 17 for detachably fixing the holder 13, which are respectively engaged with a plurality of engagement holes 19 provided on a lower surface of the holder 13. A magnet 21 for magnetically attaching the holder 13 is further inserted in the holder base 11. The holder 13 is detachably fixed to the holder base 11 by these fixing means.

The holder 13 is provided with a table 15 for supporting the optical fiber F and a cover 23 covering the optical fiber F from the above, on an upper surface thereof. The cover 23 is structured such that one side thereof is connected to the holder 13 via a hinge pin 25, whereby the cover 23 can be opened and closed. A magnet 27 is inserted in the holder 13 in an opposite side to the hinge pin 25 with respect to the optical fiber F, whereby it is possible to magnetically attach the cover 23.

A slit 29 is open to the table 15 so as to pass through from an upper surface to a lower surface. The slit 29 is provided in parallel to a direction in which the optical fiber F is supported, and a part thereof stretches to an area which the cover 23 covers.

A sliding arm 31 is movably fitted to the holder base 11, and one front end thereof protrudes to an upper side from the table 13 through the slit 29 so as to form a finger 33 for operating the cover 23. An other front end of the sliding arm 31 corresponds to a pair of grips 35 protruding to an upper side from both side surfaces of the holder base 11, and is structured such as to operate the sliding arm 31.

A front end of the finger 33 is structured as shown in FIG. 4A such that a side of the cover 23 forms an inclined surface. When the finger 33 is moved toward the cover 23 in a state in which the cover 23 is closed, the inclined surface abuts the cover 23, and the cover 23 is pushed up along the inclined surface. The sliding arm 31 is further provided with a restriction projection 33a, and the restriction projection 33a slidably engages with the table 13 according to the operation mentioned above.

Further, the holder base 11 is provided with a pair of fixed grips 39 fixed in correspondence to a pair of grips 35.

A pair of optical fibers F is fused and spliced in the following manner by using the optical fiber locking device 7.

A pair of optical fiber locking devices 7 is fixed to the optical fiber fusion splicing device 1. The cover 23 is set to an open state, and the optical fiber F is positioned on the table 15. When closing the cover 23 so as to magnetically attach to the magnet 27, the optical fiber F is fixed to the optical fiber locking device 7.

The respective optical fiber locking devices 7 are respectively driven by a pair of sliders 5 while respectively fixing the optical fiber F. The respective optical fiber locking devices 7 are driven so that a pair of optical fibers F is move close to each other, and bring front ends thereof into contact with each other. Then, the front ends of a pair of optical fibers F are fused by the fusion means 9 so as to be spliced.

Next, the sliding arm 31 is moved to the cover 23 by the grip 35. Then, a finger 33 at a front end of the sliding arm 31 pushes up the cover 23 so as to open, whereby the optical fiber F can be taken out. At this time, since the restriction projection 33a is slidably engaged with the table 59, the cover 23 is not pushed up accompanying with the operation that the cover 23 is opened. Accordingly, a force in as hearing direction is not applied to the optical fiber F.

According to the first embodiment of the present invention mentioned above, since the optical fiber F is gripped between the table 15 and the cover 23 which are magnetically attached to each other, thereby being fixed, it is possible to securely execute the fusion splicing between the optical fibers F. Further, since it is possible to easily take out the optical fiber F only by moving the grip 35 and the force in the shearing direction is not applied to the optical fiber F, after executing the connection mentioned above, the optical fiber F is not damaged.

A description will be given of a second embodiment according to the present invention with reference to FIG. 6 to FIG. 11.

An optical fiber fusion splicing device 41 is provided with a pair of sliders 45, each of which is driven by a motor (not shown) so as to move in a direction of moving close to each other and an opposite direction thereto. Each of the sliders 45 is provided with an optical fiber locking device 51 for fixing an optical fiber F, which can be moved together with the slider 45. Each of the sliders 45 is further provided with a rotation motor 47 and a support member 49, whereby it is possible to coaxially rotate the optical fiber locking device 51 with a polarization maintaining optical fiber Fa. A fusion means 53 for fusion splicing the optical fiber F is provided between a pair of optical fiber locking devices 51.

The optical fiber locking device 51 is constituted by a holder base 55 and a holder 57 detachably fixed to an upper surface of the holder base 55. The holder base 55 is provided with a plurality of guide pins 61 for detachably fixing the holder 57, which are respectively engaged with a plurality of engagement holes 63 provided on a lower surface of the holder 57. A magnet 65 for magnetically attaching the holder 57 is further inserted in the holder base 55. The holder 57 is detachably fixed to the holder base 55 by these fixing means.

The holder 57 is provided with a table 59 for supporting the polarization maintaining optical fiber Fa and a cover 67 covering the optical fiber Fa from the above, on an upper surface thereof. The cover 67 is structured such that one side thereof is connected to the holder 57 via a hinge pin 69, whereby the cover 67 can be opened and closed. A recess 81 is formed in a side facing to the table 59 in the cover 67, thereby being capable of engaging with a finger 77 mentioned below. A magnet 71 is inserted in the holder 57 in an opposite side to the hinge pin 69 with respect to the polarization maintaining optical fiber Fa, whereby it is possible to magnetically attach the cover 67.

A slit 73 is open to the table 59 so as to pass through from an upper surface to a lower surface. The slit 73 is provided in parallel to a direction in which the polarization maintaining optical fiber Fa is supported, and a part thereof stretches to an area which the cover 67 covers.

A sliding arm 75 is movably fixed to the holder base 55, and one front end thereof protrudes to an upper side from the table 59 through the slit 73 so as to form a finger 77 for operating the cover 67. Another front end of the sliding arm 75 corresponds to a pair of grips 79 protruding to an upper side from both side surfaces of the holder base 55, and is structured such as to operate the sliding arm 75. Further, a spring 83 for applying a force to the sliding arm 75 in a direction moving apart from the cover 67 is expansively compressed in an inner side of the holder base 55 and is fitted thereto.

Figure 9A:
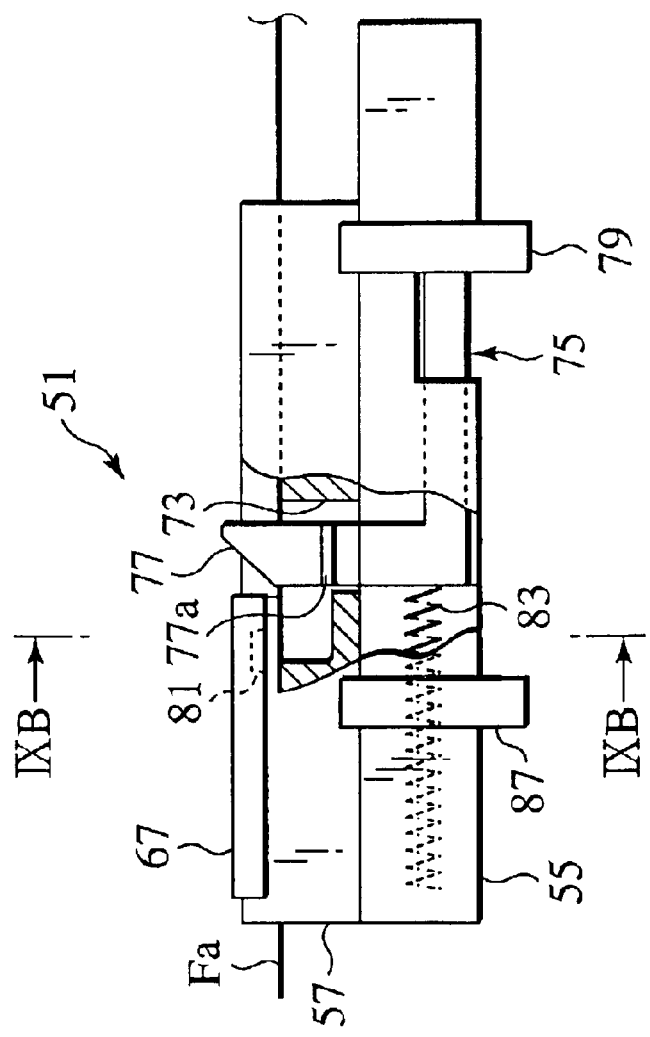
FIG. 9A is a front elevational view of the optical fiber locking device according to the second embodiment of the present invention, and shows a part of a state in which the cover is closed on the basis of a cross section.
Figure 9B:
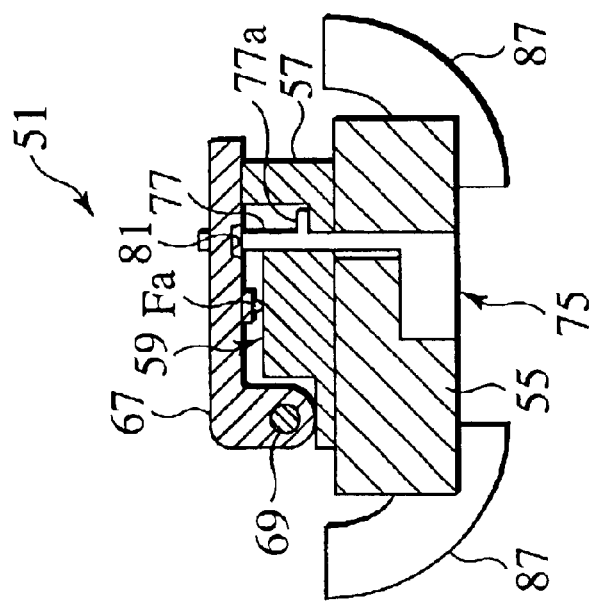
FIG. 9B is a view showing a cross section along a line IXB—IXB in FIG. 9A.

A front end of the finger 77 is structured as shown in FIG. 9A such that a side of the cover 67 forms an inclined surface. When the finger 77 is moved toward the cover 67 in a state in which the cover 67 is closed, the inclined surface abuts the cover 67, and the cover 67 is pushed up along the inclined surface. Further, the finger 77 is structured such as to be capable of being engaged with the recess 81 of the cover 67. The sliding arm 75 is further provided with a restriction projection 77a, and the restriction projection 77a slidably engages with the table 59 according to the operation mentioned above.

Further, the holder base 55 is provided with a pair of fixed grips 87 fixed in correspondence to a pair of grips 79.

A pair of optical fibers Fa is fused in the following manner by using the optical fiber locking device 51.

A pair of optical fiber locking devices 51 is respectively fixed to the optical fiber fusion splicing device 41. The cover 67 is set to an open state, and the polarization maintaining optical fiber Fa is positioned on the table 59. When closing the cover 67 so as to magnetically attach to the magnet 71, the polarization maintaining optical fiber Fa is fixed to the optical fiber locking device 51.

Each of the polarization maintaining optical fibers Fa is rotated by the rotation motor 47 while being fixed to the optical fiber locking device 51, thereby being rotated so that each of polarization directions coincides with each other. FIG. 11A shows a state in which one of a pair of optical fiber locking devices 51 is rotated, which just corresponds to a state in which upper and lower portions are inverted. In FIG. 11A, only one of the optical fiber locking devices 51 is rotated, however, both of them may be rotated. Next, a pair of optical fiber locking devices 51 are driven by a pair of sliders 45 so as to move close to each other, and bring the front ends of a pair of polarization maintaining optical fibers Fa into contact with each other. Then, the front ends of a pair of polarization maintaining optical fibers Fa are fused by the fusion means 53 so as to be spliced.

Next, the sliding arm 75 is moved to the cover 67 by the grip 79. Then, the finger 77 at a front end of the sliding arm 75 pushes up the cover 67 so as to slightly open. When further moving the sliding arm 75, the finger 77 reaches the recess 81. When entrusting the sliding arm 75 to the applying force of the spring 83 in this state, the finger 77 is engaged with the recess 81, and the cover 67 is kept in a slightly open state. In this state, the fixing of the polarization maintaining optical fiber Fa executed by the optical fiber locking device 51 is cancelled.

A pair of optical fiber locking devices 51 are again rotated by a pair of rotation motors 47, and are returned to the original states, as shown in FIG. 11B. Next, when slightly operating the grip 79, the cover 67 is opened, whereby it is possible to take out the polarization maintaining optical fiber Fa.

Since the polarization maintaining optical fiber Fa is not fixed during the operation mentioned above, no force in the twisting direction is applied, and the polarization maintaining optical fiber Fa is not damaged. Since the restriction projection 77a is slidably engaged with the table 59, the cover 67 is not pushed upward together with the opening operation. Accordingly, a force in a shearing direction is not applied to the polarization maintaining optical fiber Fa.

According to the second embodiment of the present invention mentioned above, since the polarization maintaining optical fiber Fa is gripped between the table 59 and the cover 67 which are magnetically attached to each other, thereby being fixed, it is possible to securely execute the fusion splicing between the polarization maintaining optical fibers Fa. Further, since it is possible to easily take out the polarization maintaining optical fiber Fa only by moving the grip 79 and the forces in the twisting direction and the shearing direction are not applied to the polarization maintaining optical fiber Fa, after executing the connection mentioned above, the polarization maintaining optical fiber Fa is not damaged.

A description will be given of a third embodiment according to the present invention with reference to FIGS. 12A to 13B.

An optical fiber locking device 89 is provided with a table 93 for supporting the optical fiber F and a cover 95 covering the optical fiber F from the above. The cover 95 is structured such that one side thereof is connected to the table 93 via a hinge pin 97, whereby the cover 95 can be opened and closed. A magnet 99 is inserted in the table 93 in an opposite side to the hinge pin 97 with respect to the optical fiber F, whereby it is possible to magnetically attach the cover 95.

A slit 10 is open to the table 93. The slit 101 is provided in parallel to a direction in which the optical fiber F is supported, and a part thereof reaches to an area which the cover 95 covers.

A sliding arm 103 is slidably fixed to the table 93, and one front end thereof protrudes to an upper side from the table 93 through the slit 101 so as to form a finger 105 for operating the cover 95. Another front end of the sliding arm 103 corresponds to a grip 107 protruding from one end of the table 93, and is structured such as to operate the sliding arm 103.

Figure 12A:
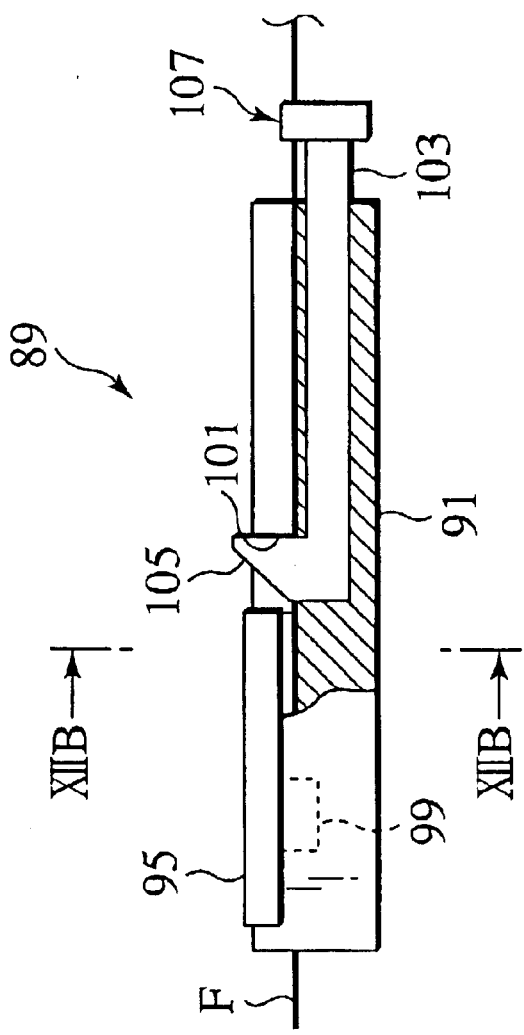
FIG. 12A is a front elevational view of an optical fiber locking device according to a third embodiment of the present invention.
Figure 12B:
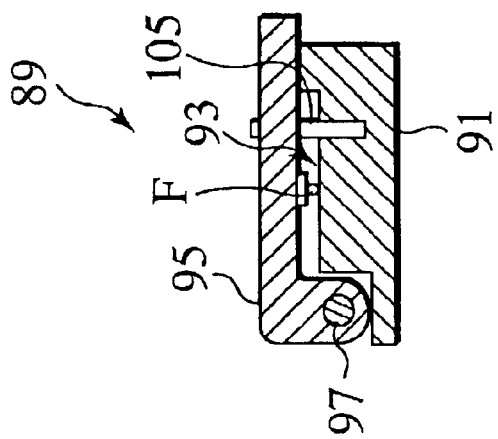
FIG. 12B is a view showing a cross section along a line XIIB—XIIB in FIG. 12A.
Figure 13A:
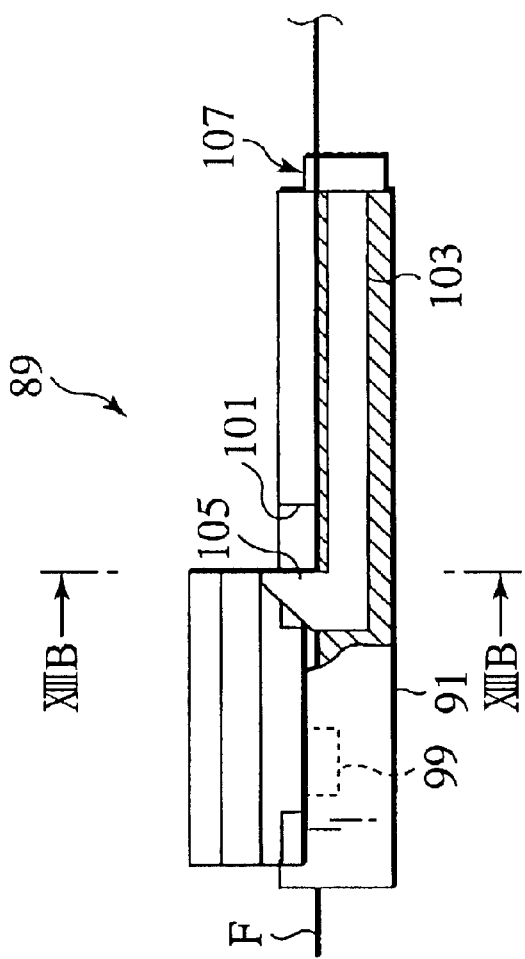
FIG. 13A is a front elevational view of the optical fiber locking device according to the third embodiment of the present invention, and shows a state in which a cover is open.
Figure 13B:
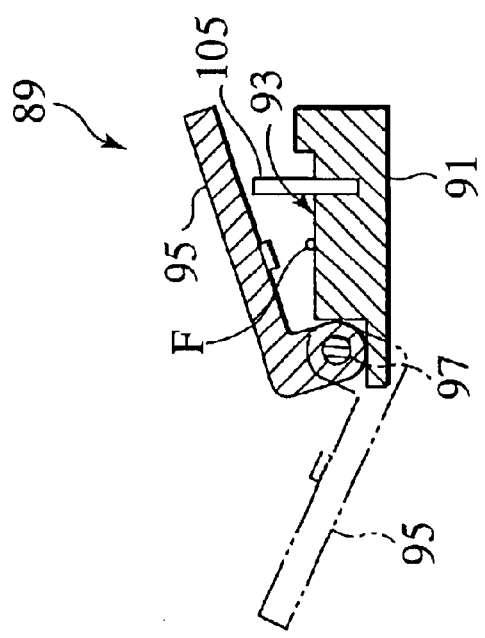
FIG. 13B is a view showing a cross section along a line XIIIB—XIIIB in FIG. 13A.

A front end of the finger 105 is structured as shown in FIG. 12A such that aside of the cover 95 forms an inclined surface. When the finger 105 is moved toward the cover 95 in a state in which the cover 95 is closed, the inclined surface abuts the cover 95, and the cover 95 is pushed up along the inclined surface.

The optical fiber locking device 89 mentioned above fixes and releases the optical fiber F in the following manner.

The cover 95 is set to an open state, and the optical fiber F is positioned on the table 93. When closing the cover 95 so as to magnetically attach to the magnet 99, the optical fiber F is fixed to the optical fiber locking device 89. After executing the fusion splicing between a pair of optical fibers in this state, the sliding arm 103 is moved to the cover 95 by the grip 107. Then, a finger 105 at a front end of the sliding arm 103 pushes up the cover 95 so as to open, whereby the optical fiber F can be taken out. At this time, since the sliding arm 103 is slidably engaged with the table 93, the cover 95 is not pushed up accompanying with the operation that the cover 95 is opened. Accordingly, a force in a shearing direction is not applied to the optical fiber F.

According to the third embodiment of the present invention mentioned above, since the optical fiber F is gripped between the table 93 and the cover 95 which are magnetically attached to each other, thereby being fixed, it is possible to securely execute the fusion splicing between the optical fibers F. Further, since it is possible to easily take out the optical fiber F only by moving the grip 107 and the force in the shearing direction is not applied to the optical fiber F, after executing the connection mentioned above, the optical fiber F is not damaged. Further, since the holder is not required, it is possible to construct the optical fiber locking device 89 compact.

The contents of Japanese Patent Application No. 2001-289865 (date of application: Sep. 21, 2001) are incorporated herein by reference.

Although the invention has been described above by reference to certain embodiments of the invention, the invention is not limited to the embodiments described above. Modifications and variations of the embodiments described above will occur to those skilled in the art, in light of the above teachings.

What is claimed is:

1. An optical fiber locking device comprising:
   a holder base;
   a table for support of an optical fiber, the table being fitted to the holder base and including a magnet and a slit;
   an openable and closable cover, being connected to the table by a hinge and detachably attached by the magnet; and
   a sliding arm including a finger protruding out from the slit so as to operate the cover and a grip, and movably fitted to the holder base,
   wherein the magnetically attached cover is pushed up so as to be opened by the finger driven by sliding the grip to a direction of the cover.

2. An optical fiber locking device according to claim 1, wherein the sliding arm further comprises a restriction projection which is slidably engaged with the table.

3. An optical fiber locking device according to claim 1, wherein the holder base further comprises a spring for applying a force to the sliding arm in a direction of moving apart from the cover, and the cover further comprises a recess for being engaged with the finger, and
   the finger is engaged with the recess so as to keep a state in which the cover is slightly open.

4. An optical fiber locking device comprising:
   a table for supporting an optical fiber, the table provided with a magnet and a slit;
   a cover which can open and close, the cover being connected to the table by a hinge and magnetically attached by the magnet; and
   a sliding arm including a grip and a finger protruding out from the slit so as to operate the cover, the sliding arm being slidably fitted to the table, wherein the magnetically attached cover is pushed up so as to be opened by the finger driven by sliding the grip to a direction of the cover.

5. An optical fiber fusion splicing device comprising a pair of optical fiber locking devices according to claim 1.

6. An optical fiber locking device comprising:

a holder base;

a table for supporting an optical fiber, the table being fitted to the holder base and including a slit;

an openable and closable cover connected to the table by a hinge;

a sliding arm including a finger protruding out from the slit so as to operate the cover and a grip, and movably fitted to the holder base; and a fixing means for holding the cover to the table in a closed state, wherein the closed cover is pushed up so as to be opened by the finger driven by sliding the grip to a direction of the cover.

* * * * *